United States Patent
Yildiz et al.

(10) Patent No.: US 11,171,451 B2
(45) Date of Patent: Nov. 9, 2021

(54) ELECTRONIC DEVICE, INTERFACE AND METHOD FOR OPERATING AN INTERFACE

(71) Applicant: Vestel Elektronik Sanayi ve Ticaret A.S., Manisa (TR)

(72) Inventors: Kadir Yildiz, Manisa (TR); Alper Sait Er, Manisa (TR)

(73) Assignee: VESTEL ELEKTRONIK SANAYI VE TICARET A.S., Manisa (TR)

( * ) Notice: Subject to any disclaimer, the term of this patent is extended or adjusted under 35 U.S.C. 154(b) by 0 days.

(21) Appl. No.: 16/452,745

(22) Filed: Jun. 26, 2019

(65) Prior Publication Data

US 2020/0412054 A1 Dec. 31, 2020

(30) Foreign Application Priority Data

Jun. 26, 2018 (EP) .................................... 18179860

(51) Int. Cl.
*H01R 13/639* (2006.01)
*H01R 43/26* (2006.01)

(52) U.S. Cl.
CPC ........... *H01R 13/639* (2013.01); *H01R 43/26* (2013.01)

(58) Field of Classification Search
CPC .... H01R 13/639; H01R 43/26; H01R 13/641; H01R 13/707; H01R 13/6275; H01R 13/633; Y10S 439/953

USPC ......................................................... 439/304
See application file for complete search history.

(56) References Cited

U.S. PATENT DOCUMENTS

| 6,244,889 | B1 | 6/2001 | James |
| 8,206,172 | B2* | 6/2012 | Katagiri .................. B60L 50/16 439/352 |
| 9,843,133 | B2* | 12/2017 | Kashani ............... H01R 13/635 |
| 2017/0000456 | A1 | 1/2017 | Henderson et al. |

FOREIGN PATENT DOCUMENTS

JP 2011238536 A 11/2011

* cited by examiner

*Primary Examiner* — Edwin A. Leon
(74) *Attorney, Agent, or Firm* — Brandon V. Zuniga; James R. Gourley; Carstens & Cahoon, LLP

(57) ABSTRACT

There is provided an electronic device (5) having an interface. The electronic device (5) has an interface connector (50, 55, 60), configured according to the interface, for engaging with a corresponding detachable connector (95, 100, 105). The electronic device (5) also has a locking mechanism (110, 65, 80, 115, 70, 85, 120, 75, 90) controllable to secure an engagement of such a detachable connector (95, 100, 105) with the interface connector (50, 55, 60). The electronic device (5) is configured to detect a use or an intended use of the interface. If detected, the electronic device (5) activates the locking mechanism (110, 65, 80, 115, 70, 85, 120, 75, 90) to secure an engagement of such a detachable connector (95, 100, 105) with the interface connector (50, 55, 60).

17 Claims, 3 Drawing Sheets

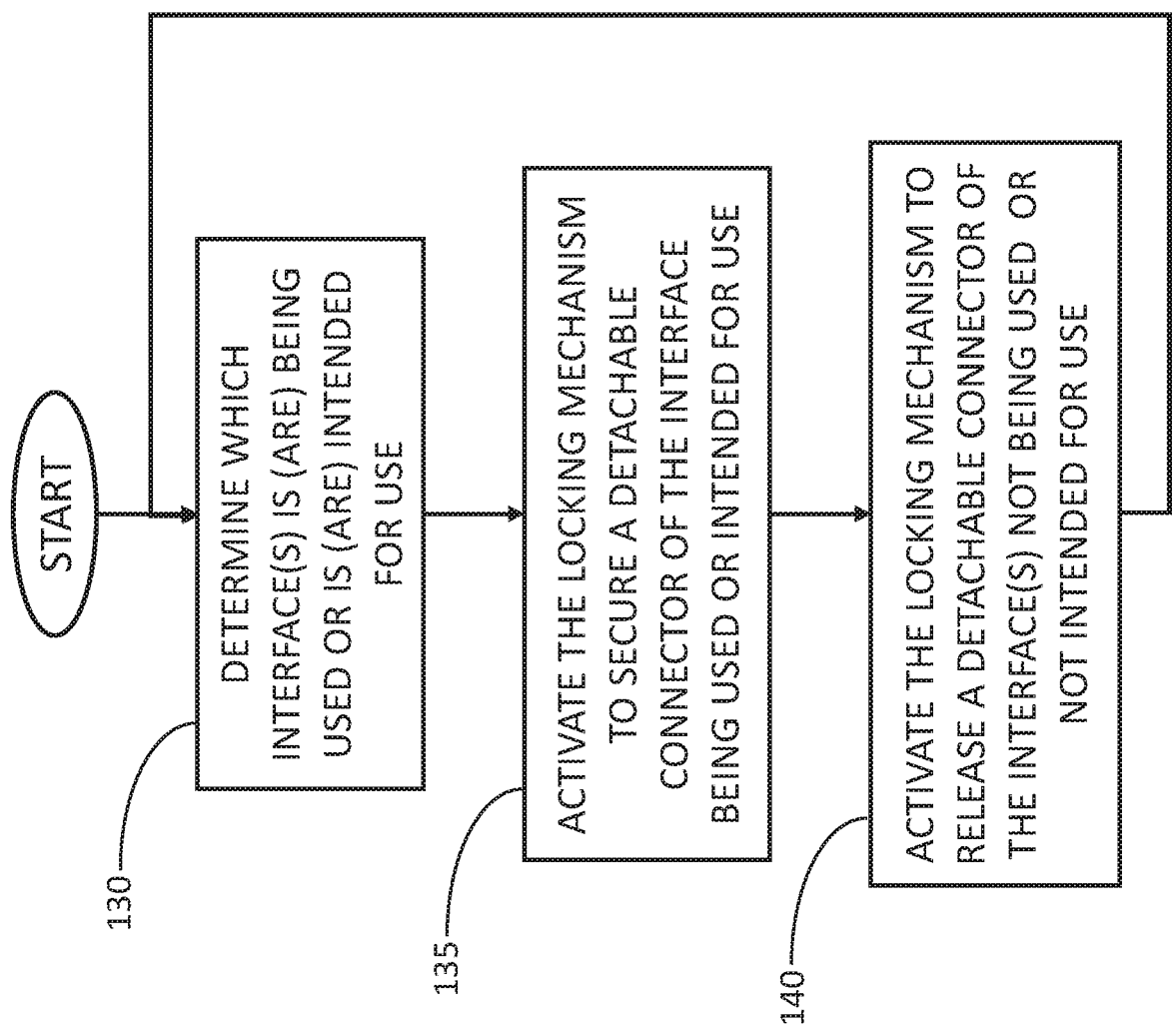

ELECTRONIC DEVICE, INTERFACE AND METHOD FOR OPERATING AN INTERFACE

CROSS-REFERENCE TO RELATED APPLICATIONS

This application claims the benefit under 35 U.S.C. § 119(a) and 37 CFR § 1.55 to European patent application 18179860.4 filed Jun. 26, 2018, the entire content of which is incorporated herein by reference.

TECHNICAL FIELD

The present disclosure relates to an electronic device, to an interface and to a method for operating an interface.

BACKGROUND

Electronic devices such as laptop computers, multi-media set-top boxes, television sets and the like are provided with interfaces to enable interconnection between devices, receipt of signals, etc. The interfaces comprises physical connectors of various types and configurations. A connector socket, defined according to the interface, is often mounted on the electronic device so that a corresponding detachable connector plug, attached to a cable or memory device for example, may be engaged with the socket connector as required to provide a link to the device.

Some types of interface connector plug include mechanical securing mechanisms to prevent unwanted disengagement of the detachable connector plug from a connector socket. For example, a plug connector on a coaxial cable may be provided with a locking nut designed to be manually rotated to engage with corresponding lugs provided on a coaxial socket connector. A Video Graphics Array (VGA) plug connector may incorporate securing bolts to engage with corresponding threaded nuts provided on a VGA socket connector.

SUMMARY

According to a first aspect disclosed herein, there is provided an electronic device having an interface, the electronic device comprising:
an interface connector, configured according to the interface for engaging with a corresponding detachable connector; and
a locking mechanism controllable to secure an engagement of a said detachable connector with the interface connector,
wherein the electronic device is configured to detect a use or an intended use of the interface and to activate the locking mechanism to secure an engagement of a said detachable connector with the interface connector.

An electronic device as disclosed herein is thereby able to rely upon an interface connection remaining engaged during what may be a critical transfer of data, or a real-time receipt or transmission of signals. Security of connection no longer relies upon a user operating a manual securing mechanism of a connector. Such mechanical securing mechanisms can be difficult to operate, especially in confined situations, or when an appropriate tool is not to hand. They often therefore remain unused, leaving a detachable connector susceptible to disengagement from a corresponding connector of an electronic device.

In an example, the interface comprises at least one of: an interface for communication of digital data; an interface for communication of analogue signals; an electrical interface for the transfer of electrical power; an optical interface for communication of optical signals; an interface to a memory device; an interface to a network; and a transmission line for conveying radio frequency signals. In principle, the techniques disclosed herein may be applied to any type of detachable connector o secure an engagement of that connector during use.

In an example, the electronic device is arranged to detect a use or an intended use of the interface comprising detecting a signal at the interface. The signal to be detected may be different for each type of interface, as would be apparent to a person of ordinary skill in the relevant art aware that the signal selected for detection is a signal likely to be indicative of a use or an intended use of the interface.

In an example, the electronic device is arranged to detect a use or an intended use of the interface comprising: detecting a user input indicative of a use or an intended use of the interface; or detecting an activation or an intended activation of a scheduled event involving a use or an intended use of the interface. The electronic device may provide an interface selector switch or it may include functionality to provide, for example, a user interface enabling a user to select a particular interface for use, e.g. an input for signals. Alternatively, or in addition, a user may enter scheduling information to trigger an event at a future time, such as a video recording of a broadcast programme, and to specify an input through which the broadcast programme is to be received. In each case, the electronic device may identify the interface in use or intended for use and may activate the associated locking mechanism to secure a respective connection for the duration of the use or intended use.

In an example implementation, the locking mechanism comprises a controllable actuator arranged to move at least one securing member configured to engage with or to disengage from a said detachable connector thereby to prevent or to enable, respectively, disengagement of the said detachable connector from the interface connector.

A person of ordinary skill in the relevant art will be aware of many example arrangements of movable securing members that can be used in implementations of the locking mechanism to engage with a detachable connector to prevent or at least to render more difficult the disengagement of that detachable connector when in use.

In an example, the electronic device comprises:
a plurality of interface connectors, each configured according to a respective interface of the electronic device to engage with a corresponding detachable connector; and
a plurality of locking mechanisms, each being controllable to secure an engagement of a said detachable connector with a respective one of the plurality of interface connectors,
wherein the electronic device is arranged, upon detecting a use or an intended use of one said interface, to activate a respective one of the plurality of locking mechanisms to secure an engagement of a said detachable connector with a respective one of the plurality of interface connectors.

According to a second aspect disclosed herein, there is provided a method for operating an interface, the interface comprising an interface connector configured according to the interface for engaging with a corresponding detachable connector and a locking mechanism controllable to secure an engagement of a said detachable connector with the interface connector, the method comprising:

detecting a use or an intended use of the interface; and upon detecting the use or intended use, activating the locking mechanism to secure an engagement of a said detachable connector with the interface connector.

In an example, the method comprises:

maintaining the secured engagement of the said detachable connector with the interface connector during the detected use or intended use of the interface; and enabling disengagement of a said detachable connector if there is no detected use or intended use of the interface.

In this way, only those detachable connectors engaged with interface connectors in use or intended for use remain secured while all others are released so that they may be disengaged if required.

In an example of the method, the detecting of a use or an intended use comprises at least one of: detecting an activation of the interface; detecting a signal at the interface; detecting a user input indicative of a use or an intended use of the interface; detecting an activation or an intended activation of a scheduled event involving a use or an intended use of the interface.

In an example of the method, the interface is one of a plurality of interfaces each comprising an interface connector configured according to the respective interface for engaging with a corresponding detachable connector, and a locking mechanism controllable to secure an engagement of a said detachable connector with the interface connector, the method comprising:

detecting a use or an intended use of one of the plurality of interfaces; and upon detecting the use or intended use, activating a respective one of the plurality of locking mechanisms to secure an engagement of a said detachable connector with a respective of one the plurality of interface connectors.

According to a third aspect disclosed herein, there is provided an interface, comprising:

an interface connector configured for engaging with a corresponding detachable connector;

a locking mechanism controllable to secure an engagement of a corresponding detachable connector with the interface connector; and a controller, wherein the controller is configured to detect a use or an intended use of the interface and to activate the locking mechanism to secure an engagement of a said detachable connector with the interface connector.

Such an interface as disclosed herein may be provided as a stand-alone item to be installed in an electronic device, having the facility to secure a detachable connector when engaged with a connector of the interface.

In an example, the interface comprises at least one of: an interface for communication of digital data; an interface for communication of analogue signals; an electrical interface for the transfer of electrical power; an optical interface for communication of optical signals; an interface to a memory device; an interface to a network; and a transmission line for conveying radio frequency signals.

In an example of the interface, the controller is configured to control the locking mechanism to maintain a secured engagement of the said detachable connector with the interface connector during the detected use or intended use of the interface and to enable disengagement of a said detachable connector if there is no detected use or intended use of the interface.

In an example of the interface, the controller is configured to detect a use or an intended use comprising at least one of: detecting a signal at the interface; detecting a user input indicative of a use or an intended use of the interface; detecting an activation or an intended activation of a scheduled event involving a use or an intended use of the interface.

In an example implementation of the interface, the locking mechanism comprises a controllable actuator arranged to move at least one securing member configured to engage with or to disengage from a said detachable connector thereby to prevent or to enable, respectively, disengagement of the said detachable connector from the interface connector.

BRIEF DESCRIPTION OF THE DRAWINGS

To assist understanding of the present disclosure and to show how embodiments may be put into effect, reference is made by way of example to the accompanying drawings in which:

FIG. 3 shows an example of a process as may implemented using a controller associated with an interface according to the present disclosure, provided on an electronic device according to the present disclosure.

DETAILED DESCRIPTION

Electronic devices are commonly provided with various interfaces having associated physical connectors to enable input and output of signals, data and power. Such interfaces may enable an interconnection of one electronic device with other electronic device or enable an input or output of signals from or to an antenna, for example. In one example, a television may be provided with a co-axial transmission line connector for receiving broadcast or closed circuit television signals and a variety of other connector types for the input and output of digital data and analogue signals.

Reliability of connection for some types of interface and during particular uses of an available interface is of particular concern for some applications. For example, during the transfer of real-time data or signals, any disengagement of a connector through which such data or signals are being transferred may incur data or signal loss and consequential inconvenience. Software updates may, for example, leave a device in an unstable state if the associated data transfer is interrupted when a connector becomes disengaged. An interruption due to disengagement of a connector may have health and safety implications, for example if displaying real-time images, video or data that is being relied upon by a viewer to perform a safety-critical task.

Examples of the different types of interface provided in electronic devices include: a Universal Serial Bus (USB) interface; a High Definition Multi-media Interface (HDMI); a Video Graphics Array (VGA) interface; a Digital Visual Interface (DVI); a DisplayPort interface; a phono socket; an aerial socket or other transmission line connector; and an optical interface. Other types of interface and associated physical interface connectors are known to a person of ordinary skill in the relevant art. In each case, an interface connector provided in fixed association with the electronic device, for example a connector socket mounted in a housing of the electronic device, may be arranged to engage with a corresponding detachable connector plug, according to the application of the respective interface.

As discussed above there is some benefit in ensuring that a detachable connector does not become detached during some critical use of the associated interface. A technique according to the present disclosure for helping to ensure that detachable connectors remain engaged, at least during an intended use of the interface, will now be described with reference to FIGS. 1 to 3. In particular, an example embodiment of the technique applied to a television will be described firstly with reference to FIG. 1.

Figure 1:
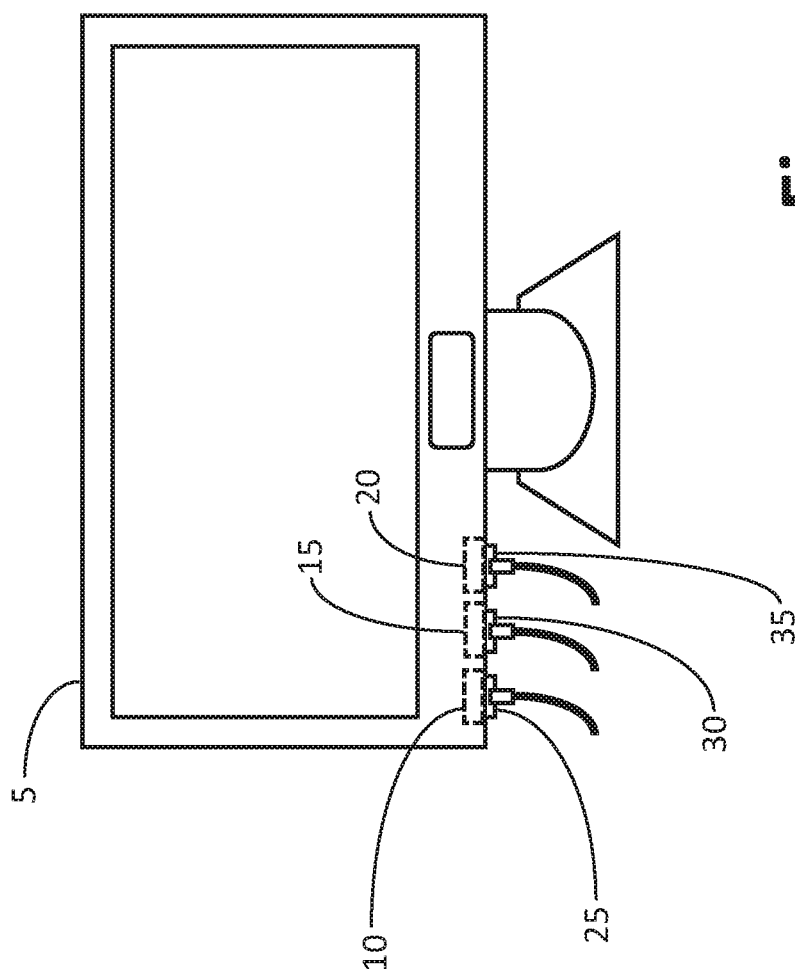
FIG. 1 shows schematically an example of an electronic device, in this example a television, having three interface connectors.

Referring to FIG. 1, a television 5 is provided with three connector sockets 10, 15, 20 accessible at a lower edge of a casing of the television 5. The connector sockets 10, 15, 20 are configured according to respective interface standards to receive and engage with corresponding detachable connectors 25, 30, 35 respectively, to enable connection to external devices and signal sources, as appropriate.

Conventional connector arrangements may be susceptible to unwanted disengagement of a detachable connector 25, 30, 35 from the respective connector socket 10, 15, 20 during a period of use of the interface. It is known for some types of detachable connector 25, 30, 35 to be provided with screws or clips to enable the detachable connector 25, 30, 35 to be securely fixed to the respective connector socket 10, 15, 20 manually. However, such fixing arrangements can be awkward to operate and for that reason are often not used, in particular where a connection is only intended to be temporary. Many of the commonly used types of detachable connector 25, 30, 35 are not provided with such fixings as they add undesirably to the physical size of the detachable connector 25, 30, 35.

Figure 2:
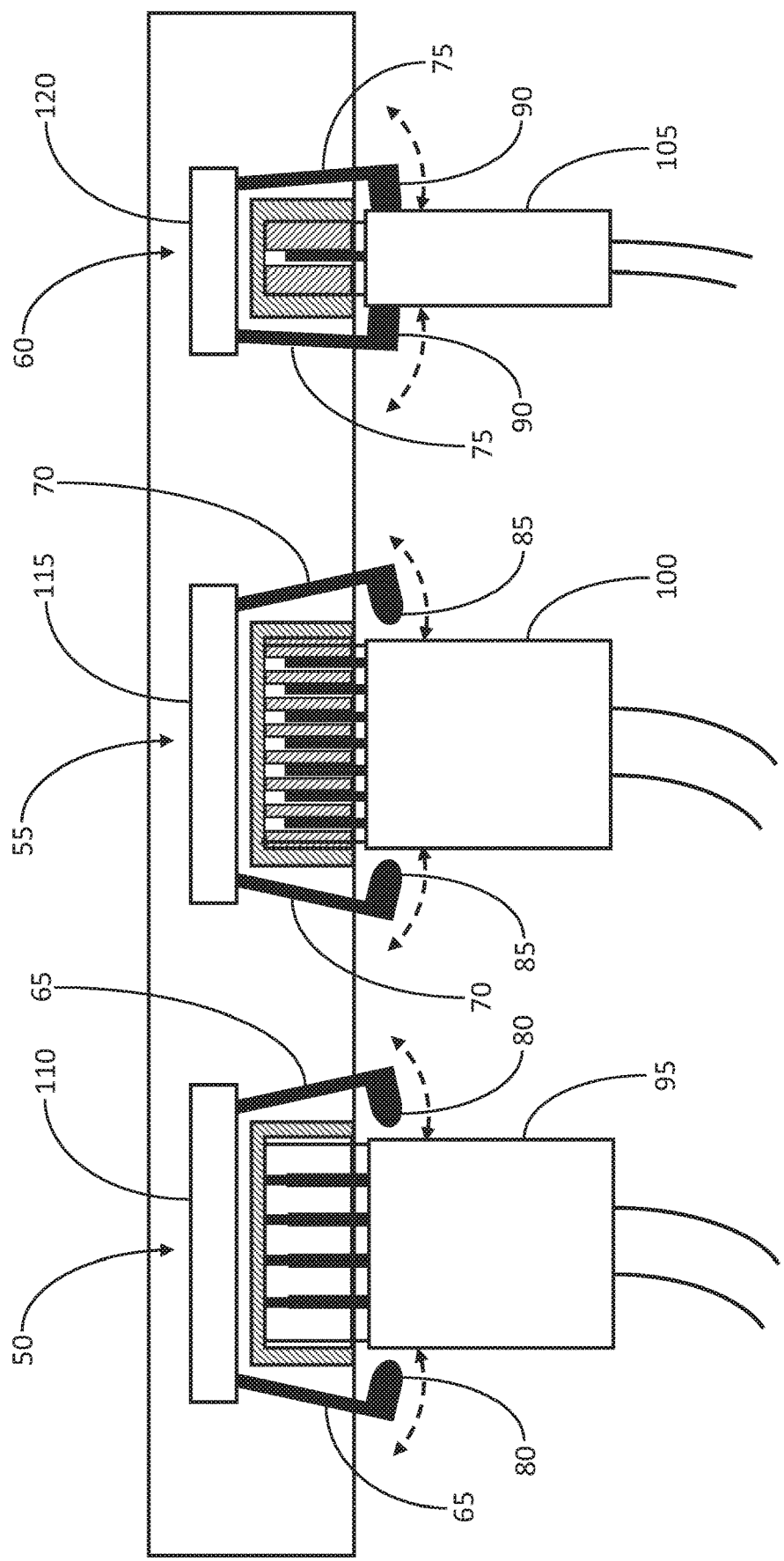
FIG. 2 shows schematically an example of a group of interface connectors are may be provided on an electronic device according to the present disclosure.

Referring to FIG. 2, according to one example of the present disclosure, three different types of interface connector socket 50, 55, 60 arrangement are provided. The connector arrangements 50, 55, 60 may be used to replace the connector sockets 10, 15, 20 shown in FIG. 1 of the television 5. Each connector socket arrangement 50, 55, 60 includes a locking mechanism comprising a respective pair of arms 65, 70, 75. Each arm has an end portion 80, 85, 90 made for example using a resilient high-friction material for use in gripping a respective detachable connector 95, 100, 105.

The locking mechanism of the connector socket arrangement 50, 55, 60 also comprises an actuator 110, 115, 120 arranged to move the respective pair of arms 65, 70, 75. Each actuator 110, 115, 120 is controllable to move the respective pair of arms 65, 70, 75 between a first position, as shown in FIG. 2 for the connector socket arrangements 50, 55, and a second position, as shown in FIG. 2 for the socket arrangement 60. In the first position, the end portions 80, 85, 90 of the arms 65, 70, 75 are separated from a detachable connector 95, 100, 105 when engaged with the respective connector 50, 55, 60, enabling the detachable connector 95, 100, 105 to be engaged with and disengaged from the respective connector socket 50, 55, 60 without resistance. In the second position, the end portions 80, 85, 90 are pressed against a respective detachable connector 95, 100, 105 when engaged with the respective connector socket 50, 55, 60 to grip the detachable connector 95, 100, 105 and so prevent its disengagement from the connector socket arrangement 50, 55, 60.

The locking mechanism may be configured so that when a power supply to the electronic device switched off, any of the arms 65, 70, 75 that are in the second position are released so that any detachable connector 95, 100, 105 that is engaged with one of the connector sockets 50, 55, 60 may be disengaged without resistance.

The locking mechanism may be implemented as a feature of one or more of the connector socket arrangements 50, 55, 60, and therefore as a feature of the respective interface itself. Alternatively, the locking mechanism may be implemented as a feature of the electronic device, mounted for example in an external casing of the electronic device.

In other examples, as would be apparent to a person of ordinary skill in the relevant art aware of the principles embodied in the arrangements shown in FIG. 2, mechanical arrangements using movable mechanical components different from the arrangement of arms 65, 70, 75 and actuators 110, 115, 120 shown in FIG. 2, may be provided for securing the engagement of a detachable connector 95, 100, 105. Such mechanical components may include sliding or pivoting mechanical components arranged either to grip a detachable connector 95, 100, 105 or to lock the connector 95, 100, 105 in position by engaging with a recess other corresponding feature provided in the detachable connector 95, 100, 105, when it is engaged with the connector socket arrangement 50, 55, 60. Each actuator 110, 115, 120 may comprise for example an electric motor or an electromagnet to move the arms 65, 70, 75 or other mechanical components to secure the detachable connector 95, 100, 105.

A controller (not shown in FIG. 2) may be included to control the actuators 110, 115, 120. The controller may be implemented as a feature of one or more connector socket arrangements 50, 55, 60, and therefore as a feature of the interface itself. Alternatively, a controller may be implemented as a feature of an electronic device comprising the respective interfaces, for example as additional functionality of a processor provided in the television 5. An example of the functionality implemented by the controller will now be described with reference to FIG. 3. In that example, it is assumed that the electronic device is provided with more than one interface and that the controller is provided to control locking mechanisms of any one or more of the connector socket arrangements 50, 55, 60 of the provided interfaces.

Referring to FIG. 3, a flow chart is provided showing an example of a process as may be implemented by the controller. Firstly, the controller is arranged, at 130, to detect for each interface provided on the electronic device 5 whether the interface is in use or is intended to be used. The controller may achieve this in a number of different ways. For example, the controller may be arranged to detect a signal at the respective connector socket arrangement 50, 55, 60 of the interface indicative of an active use of the interface. The signal may be a signal originating from within the electronic device 5 or it may be a signal originating with another electronic device via a detachable connector 95, 100, 105. Alternatively, the controller may detect a user input to the electronic device indicative of a use or an intended use of a particular interface. For example, if the user selects a particular input to the electronic device 5, then the controller may be arranged to identify the particular interface intended to receive the selected input. Similarly, the controller may be arranged to detect, for each interface, whether the interface is not in use or is not intended to be used.

At 135, for each interface that the controller detects as being used or intended for use, the controller activates the locking mechanism, in particular the actuator 110, 115, 120, and secures a respective detachable connector 95, 100, 105 engaged with the respective interface connector socket arrangement 50, 55, 60. Similarly, at 140, the controller releases a respective detachable connector 95, 100, 105 engaged with each interface connector socket arrangement 50, 55, 60 that the controller detects as not being used or not intended for use. The controller then repeats the process to detect any changes of use or intended use and to act upon any such change.

The controller may, for example, be arranged to ensure, if there is a loss of power to the electronic device 5 or if the electronic device 5 is switched off or put into a standby mode, that all detachable connectors 95, 100, 105 currently engaged with connector sockets 50, 55, 60 provided in or associated with the electronic device are released so that they may be disengaged if required without resistance.

The above has been described principally as being applied to television sets. However, the principles described herein may be applied to other electronic devices, including for example a display screen or panel, a set top box, a PVR (personal video recorder, also known as a DVR or digital video recorder), a DVD player, a Blu-ray player, a personal computing device such as a laptop or desktop or tablet computer, a video game console, a media player, etc.

It will be understood that the controller referred to herein may in practice be provided by a single chip or integrated circuit or plural chips or integrated circuits, optionally provided as a chipset, an application-specific integrated circuit (ASIC), field-programmable gate array (FPGA), digital signal processor (DSP), graphics processing units (GPUs), etc. The chip or chips may comprise circuitry (as well as possibly firmware) for embodying at least one or more of a data processor or processors, a digital signal processor or processors, baseband circuitry and radio frequency circuitry, which are configurable so as to operate in accordance with the exemplary embodiments. In this regard, the exemplary embodiments may be implemented at least in part by computer software stored in (non-transitory) memory and executable by the processor, or by hardware, or by a combination of tangibly stored software and hardware (and tangibly stored firmware).

Although at least some aspects of the embodiments described herein with reference to the drawings comprise computer processes performed in processing systems or processors, the invention also extends to computer programs, particularly computer programs on or in a carrier, adapted for putting the invention into practice. The program may be in the form of non-transitory source code, object code, a code intermediate source and object code such as in partially compiled form, or in any other non-transitory form suitable for use in the implementation of processes according to the invention. The carrier may be any entity or device capable of carrying the program. For example, the carrier may comprise a storage medium, such as a solid-state drive (SSD) or other semiconductor-based RAM; a ROM, for example a CD ROM or a semiconductor ROM; a magnetic recording medium, for example a floppy disk or hard disk; optical memory devices in general; etc.

The examples described herein are to be understood as illustrative examples of embodiments of the invention. Further embodiments and examples are envisaged. Any feature described in relation to any one example or embodiment may be used alone or in combination with other features. In addition, any feature described in relation to any one example or embodiment may also be used in combination with one or more features of any other of the examples or embodiments, or any combination of any other of the examples or embodiments. Furthermore, equivalents and modifications not described herein may also be employed within the scope of the invention, which is defined in the claims.

The invention claimed is:

1. An electronic device having an interface, the electronic device comprising:
    an interface connector configured to engage with a corresponding detachable connector of an external device to connect the external device to the electronic device; and
    a locking mechanism controllable to secure an engagement of the detachable connector with the interface connector,
    wherein the electronic device is configured to detect a use of the interface to transfer a signal between the external device and the electronic device by detecting the signal at the interface passing between the external device and the electronic device and, upon detecting the use of the interface, to activate the locking mechanism to secure an engagement of the detachable connector with the interface connector whilst the signal is being transferred between the external device and the electronic device.

2. The electronic device according to claim 1, wherein the interface comprises at least one of: an interface for communication of digital data; an interface for communication of analog signals; an electrical interface for the transfer of electrical power; an optical interface for communication of optical signals; an interface to a memory device; an interface to a network; and a transmission line for conveying radio frequency signals.

3. The electronic device according to claim 1, wherein the electronic device is arranged to detect use or an imminent use of the interface by: detecting a user input indicative of a use or an intended use of the interface; or detecting an activation or an imminent activation of a scheduled event involving a use or an imminent use of the interface.

4. The electronic device according to claim 1, wherein the locking mechanism comprises a controllable actuator configured to move at least one securing member configured to engage with or to disengage from the detachable connector thereby to prevent or to enable, respectively, disengagement of the detachable connector from the interface connector.

5. The electronic device according to claim 1, comprising:
    a plurality of interface connectors each respectively configured to engage a respective interface of the electronic device with a respective detachable connector; and
    a plurality of locking mechanisms each being controllable to secure an engagement of a respective one of the detachable connectors with a respective one of the plurality of interface connectors,
    wherein the electronic device is configured, upon detecting a use of a respective one of the interfaces, to activate a respective one of the plurality of locking mechanisms to secure an engagement of a respective one of the detachable connectors with a respective one of the plurality of interface connectors.

6. A method of operating an interface of an electronic device, the interface comprising an interface connector configured for engaging with a corresponding detachable connector of an external device to connect the external device to the electronic device and a locking mechanism controllable to secure an engagement of the detachable connector with the interface connector, the method comprising:

detecting a use of the interface to transfer a signal between the external device and the electronic device by detecting the signal at the interface passing between the external device and the electronic device; and upon detecting the use, activating the locking mechanism to secure an engagement of the detachable connector with the interface connector whilst the signal is being transferred between the external device and the electronic device.

7. The method according to claim 6, comprising:

maintaining the secured engagement of the detachable connector with the interface connector during the detected use the interface; and enabling disengagement of the detachable connector if there is no detected use of the interface.

8. The method according to claim 6, wherein the detecting of a use comprises at least one of: detecting an activation of the interface; detecting a user input indicative of a use of the interface; detecting an activation of a scheduled event involving a use or an intended use of the interface.

9. The method according to claim 6, wherein the interface is one of a plurality of interfaces each comprising a respective interface connector configured for engaging with a respective detachable connector, and a respective locking mechanism controllable to secure an engagement of the respective detachable connector with the respective interface connector, the method comprising:

detecting a use or an imminent use of a respective one of the plurality of interfaces; and upon detecting the use or imminent use, activating a respective one of the plurality of locking mechanisms to secure an engagement of a respective one of the detachable connectors with a respective of one the plurality of interface connectors.

10. An interface for an electronic device, the interface comprising:

an interface connector configured for engaging with a corresponding detachable connector of an external device to connect the external device to the electronic device;

a locking mechanism controllable to secure an engagement of the corresponding detachable connector with the interface connector; and a controller, wherein the controller is configured to detect a use the interface to transfer a signal between the external device and the electronic device by detecting a signal at the interface passing between the external device and the electronic device and, upon detecting the use of the interface, to activate the locking mechanism to secure an engagement of the detachable connector with the interface connector whilst the signal is being transferred between the external device and the electronic device.

11. The interface according to claim 10, wherein the interface comprises at least one of: an interface for communication of digital data; an interface for communication of analogue signals; an electrical interface for the transfer of electrical power; an optical interface for communication of optical signals; an interface to a memory device; an interface to a network; and a transmission line for conveying radio frequency signals.

12. The interface according to claim 10, wherein the controller is configured to control the locking mechanism to maintain a secured engagement of the detachable connector with the interface connector during the detected use of the interface and to enable disengagement of the detachable connector if there is no detected use of the interface.

13. The interface according to claim 10, wherein the controller is configured to detect a use or an imminent use by at least one of: detecting a user input indicative of a use or an imminent use of the interface; detecting an activation or an imminent activation of a scheduled event involving a use or an imminent use of the interface.

14. The interface according to claim 10, wherein the locking mechanism comprises a controllable actuator configured to move at least one securing member to engage with or to disengage from the detachable connector thereby to prevent or to enable, respectively, disengagement of the detachable connector from the interface connector.

15. The electronic device according to claim 1, wherein the controller is configured such that a detachable connector currently engaged with the interface connector is released if there is a loss of power to the electronic device or if the electronic device is switched off or put into a standby mode.

16. The method according to claim 6, wherein the controller is configured such that a detachable connector currently engaged with the interface connector is released if there is a loss of power to an electronic device having the interface connector or if the electronic device is switched off or put into a standby mode.

17. The interface according to claim 10, wherein the controller is configured such that a detachable connector currently engaged with the interface connector is released if there is a loss of power to the electronic device or if the electronic device is switched off or put into a standby mode.

* * * * *